Patented Sept. 9, 1924.

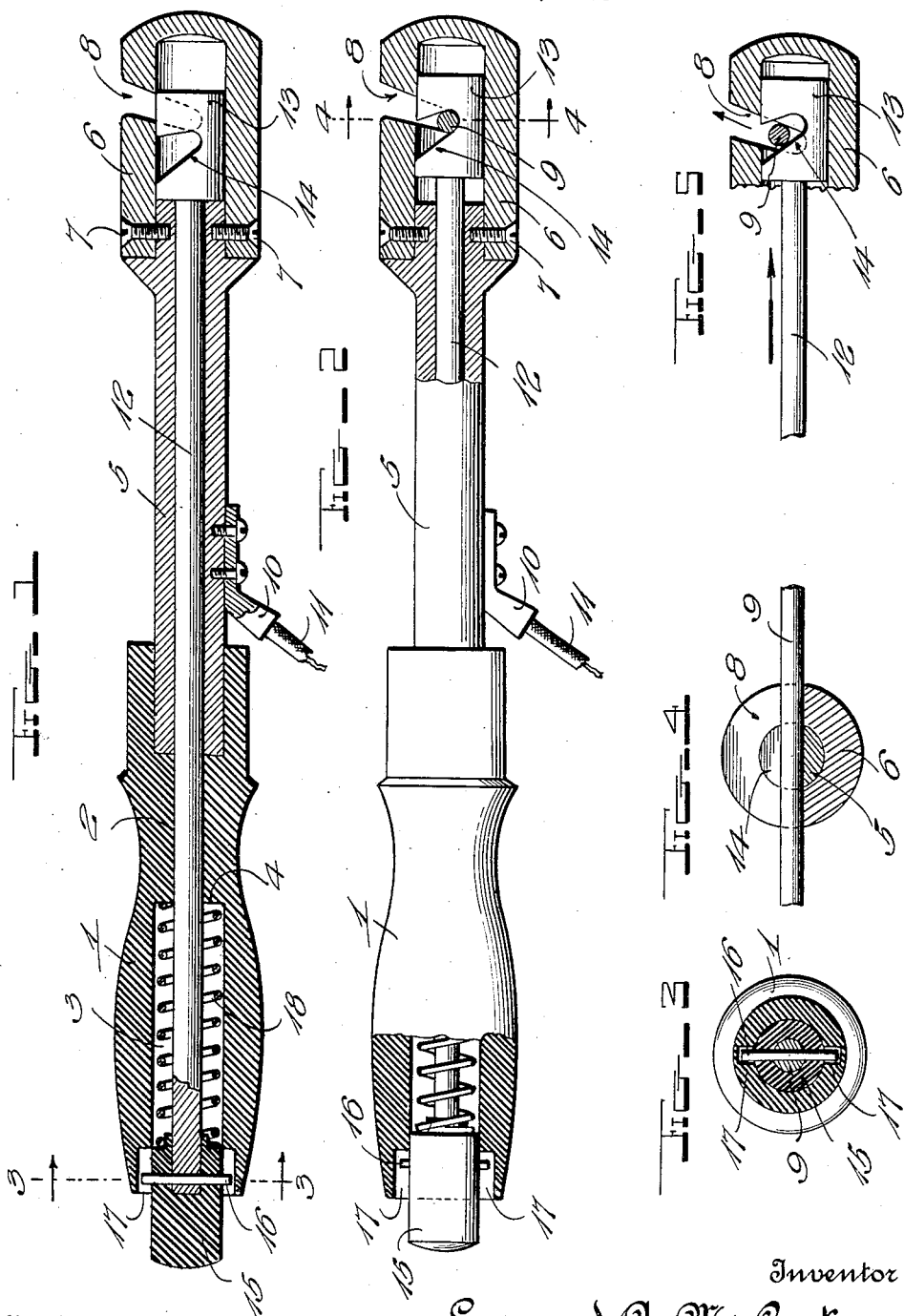

1,507,788

UNITED STATES PATENT OFFICE.

LEONARD A. McCARTY, OF JACKSON, OHIO.

ELECTRIC WELDING TOOL.

Application filed April 14, 1924. Serial No. 706,452.

*To all whom it may concern:*

Be it known that I, LEONARD A. McCARTY, a citizen of the United States, residing at Jackson, in the county of Jackson and State of Ohio, have invented certain new and useful Improvements in Electric Welding Tools; and I do declare the following to be a full, clear, and exact description of the invention, such as will enable others skilled in the art to which it appertains to make and use the same.

My invention relates to improvements in tools for holding the well known electrode wires while electric welding is being done, the principal object being to provide a tool of this character which is greatly simplified over others heretofore devised, yet is equally as, if not more efficient and desirable than the prior devices.

Another object is to provide improved means for engaging the electrode wire and rigidly holding it when in use, as well as for positively ejecting said wire when a new one is to be inserted.

With the foregoing in view, the invention resides in the novel subject matter hereinafter described and claimed, the description being supplemented by the accompanying drawing.

Figure 1 is a longitudinal sectional view partly in elevation, showing the relation of parts when no electrode is being held by the device.

Figure 2 is a side elevation partly in section showing an electrode held in operative position by the tool.

Figures 3 and 4 are transverse sectional views as indicated by lines 3—3 and 4—4 of Figs. 1 and 2 respectively.

Figure 5 is a detail longitudinal sectional view showing the manner in which the electrode is ejected when desired.

In the drawing above briefly described, the numeral 1 designates a substantially straight, elongated handle which may be formed of hard wood, or any desired insulating material. This handle is provided throughout its length with a bore having a relatively small front portion 2 and a larger rear portion 3, an abrupt shoulder 4 being formed at the junction of the two diameters of said bore. A tubular, current conducting shank 5 projects rigidly forward from the handle 1, in alinement with its bore, and in the present showing, the front end of said shank is provided with a hollow cylindrical head 6 secured thereto by machine screws 7. This head is formed with a transverse slot 8 from its exterior to its interior constituting a seat for an electrode wire 9. The slot 8 preferably widens toward its center, from both ends, and I prefer that said slot shall have its front and rear walls in planes oblique to the axis of the tool, as shown.

By any desired connector 10, a current conducting wire 11 is secured to the shank 5, said conductor being preferably connected with said shank at a point adjacent the front extremity of the handle 1, so that a well balanced tool is provided.

Slidably received in the shank 5 and bore of the handle 1, is a rod 12 which is here shown as formed with an enlarged front end 13, slidably received in the hollow head 6 of said shank 5. In this head 13, I have shown a lateral slot 14 which co-operates with the slot 8 in holding the electrode wire 9. The front and rear sides of the slot 14 are oblique to the axis of the tool and are disposed at an acute angle to the corresponding sides of the slot 8. Thus, as long as rearward pressure is exerted on the rod 12, the electrode 9 will be tightly held in the slots 8 and 14, but when forward pressure is exerted on said rod as shown in Fig. 5, the oblique rear wall of the slot 14 and the oblique front wall of the slot 8, co-operate in forcing the electrode laterally out of the slots. Thus, the electrode may be readily removed, even though it may have expanded to some extent due to heat. Attention may here be directed also to the fact that as the electrode is laterally moved from engagement with the tool, any protuberances formed on the ends of the electrode during welding operations, will not interfere with such removal.

The rod 12 is provided at its rear end with an enlargement which is preferably in the form of an insulating knob 15 of hard wood or other suitable material. This knob may well be secured to the rod by a pin 16, the ends of which are shown projecting and slidably received in internal grooves 17 in the handle, to hold the rod against turning. Between the front end of the knob 15, which is slidably engaged with the enlarged end 3 of the handle bore and the shoulder 4 at the front end of said enlarged bore portion, I have shown a coiled compression spring 18 which exerts a constant rearward force on the rod 12 to hold the electrode 9 in operative position. The knob 15 projects accessibly rearward from the handle 1 however so that by forcing forwardly upon this knob, the rod 12 may be forwardly shifted to eject the electrode 9.

By providing the construction shown and described or a substantial equivalent thereof, a welding tool is produced which is of extreme simplicity, yet is highly advantageous and desirable. All metallic parts are preferably formed of copper, on account of superior current-conducting qualities, but it will be understood that within the scope of the invention as claimed, any adequate materials may be used and furthermore numerous minor changes may be made, over the construction disclosed.

I claim:

1. An electric welding tool comprising an elongated insulating handle having a bore from end to end, a tubular current conducting shank projecting forwardly from said handle in alinement with its bore, said shank having an electrode seat at its front end and being adapted for connection with a current supply wire, a rod passing slidably through said shank and said bore and having means at its front end for exerting rearward pressure on an electrode to hold the latter in the aforesaid seat, and a spring within said bore of the handle exerting rearward force on said rod, the rear end of said rod projecting accessibly beyond the handle to permit the rod to be easily forced forwardly to release the electrode.

2. An electric welding tool comprising an elongated insulating handle having a bore throughout its length enlarged at its rear end, a tubular current conducting shank projecting forwardly from said handle and having an electrode seat at its front end, said shank being adapted for connection to a current supply wire, a rod passing slidably through said shank and the bore of the handle and having means at its front end for exerting rearward pressure on an electrode to hold the latter in the aforesaid seat, and a coiled compression spring in the enlarged rear end of the above named bore, said rod having an enlarged rear end slidably received in said enlarged bore end and abutting the rear end of said spring, said rod projecting accessibly from the handle to permit the rod to be easily forced forwardly to release the electrode.

3. An electric welding tool comprising a tubular handle-carried outer member having a transverse slot from its interior to its exterior provided with front and rear walls oblique to the axis of said outer member, and an inner spring-held manually slidable member within said outer member, said inner member having a transverse slot cooperable with the aforesaid slot in holding an electrode, the front and rear walls of the slot of said inner member being oblique to the axis of such member and being disposed at an acute angle to the front and rear walls of the first named slot, for the purpose set forth.

In testimony whereof I have hereunto affixed my signature.

LEONARD A. McCARTY.